April 9, 1963 D. A. BROSSEAU 3,085,137

SWITCHING DEVICE

Filed Feb. 13, 1961 4 Sheets-Sheet 1

INVENTOR.

DON. A. BROSSEAU

BY

Mason, Kolehmainen, Rathburn and Wyss

ATTORNEYS.

April 9, 1963 D. A. BROSSEAU 3,085,137

SWITCHING DEVICE

Filed Feb. 13, 1961 4 Sheets-Sheet 2

INVENTOR.
DON A. BROSSEAU
BY
Mason, Kolehmainen, Rathburn and Wyss
ATTORNEYS.

April 9, 1963 D. A. BROSSEAU 3,085,137

SWITCHING DEVICE

Filed Feb. 13, 1961

4 Sheets-Sheet 3

INVENTOR.
DON A. BROSSEAU
BY
Mason, Kolehmainen, Rathburn and Wyss
ATTORNEYS.

April 9, 1963 D. A. BROSSEAU 3,085,137

SWITCHING DEVICE

Filed Feb. 13, 1961 4 Sheets-Sheet 4

INVENTOR.
DON A. BROSSEAU
BY
Mason, Kolehmainen, Rathburn and Wyss
ATTORNEYS.

3,085,137
SWITCHING DEVICE

Don A. Brosseau, Chicago, Ill., assignor to Vapor Corporation, a corporation of Delaware Filed Feb. 13, 1961, Ser. No. 88,725
13 Claims. (Cl. 200—112)

The present invention relates to switching apparatus, and more particularly to an electromagnetic switching device for switching high currents which is operated in response to changes in a low level electrical characteristic, such as current or voltage, thus providing in a single device the functions usually performed by the combination of a sensitive low current actuated switching device which in turn operates a high current switching device. More particularly, the present invention relates to a high current switching apparatus and circuit that is actuated by a low level variable characteristic that falls below or rises above a predetermined level.

There are numerous electrical characteristics of low level which one would like to be able to use to actuate a control device. One example is the low current passing through a light responsive device whose conductivity varies in dependence upon the ambient light. Other examples would be the low current passing through a temperature responsive device whose conductivity varies in relation to the ambient temperature, or the low current passing through a pressure responsive device whose conductivity varies in dependence upon the pressure applied to it. Often the change in ambient light, the change in temperature or the change in pressure is very gradual, which means that the change in an electrical characteristic of the light, temperature, or pressure sensitive element used to perform a control function is also very gradual.

Although the present invention is equally applicable for use where the low level electrical characteristic for actuating the device may be produced in any manner, the invention is described hereinafter particularly in connection with light responsive control means. Light responsive switching apparatus has been used extensively in connection with street lighting systems, billboards and advertising lighting, floodlighting, warning lights, and the like. Where the present invention is used in connection with illumination control means, it would be desirable to provide means for automatically turning on such lights whenever illumination is needed at a selected predetermined degree of darkness regardless of the particular time of day, which control means will also automatically turn off or otherwise render itself ineffective when the illumination is not needed. One such high current switching device and a circuit therefor that is actuated by a low level variable electrical characteristic is disclosed and claimed in my joint copending application with William C. Keeran, Serial No. 782,823, filed December 24, 1956. The present switching device has particular utility in the type of switching circuit described in that copending application, and represents an improvement over the switching device therein disclosed.

In my aforementioned joint application, there is disclosed an electromagnetic switching device comprising a mercury switch having a glass housing. This device also includes electromagnetic means for actuating the switch including a stationary magnetic member, and a pilot armature and a main armature both movable toward the stationary member. When the pilot armature engages the stationary magnetic member in response to a low level of electrical energy, a control or power circuit is closed which energizes the electromagnetic means to insure positive actuation of the main armature. While the aforementioned switching device is quite satisfactory for many installations, it has been found that the mercury switch with a glass housing is difficult and expensive to manufacture and is fragile from a shipping and packing problem. It would, therefore, be desirable to provide an electromagnetic switching device which is readily and economically manufactured. Moreover, it would be desirable to provide an electromagnetic switching device with improved relay means including a main armature and a pilot armature.

Accordingly, it is an object of the present invention to provide a new and improved switching apparatus operable in response to changes in a variable low level electrical characteristic.

It is another object of the present invention to provide a new and improved switching apparatus for switching high current loads in a foolproof manner in response to a low level variable electrical characteristic which falls below or raises above a predetermined level.

It is a further object of the present invention to provide an electromagnetic relay type switching device which can be readily and economically manufactured.

Still another object of the present invention resides in the provision of an improved electromagnetic switching device which is of sturdy construction, which is simple and inexpensive to manufacture, and which will give many years of foolproof service.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings, in which.

Figures 1, 2, 3:
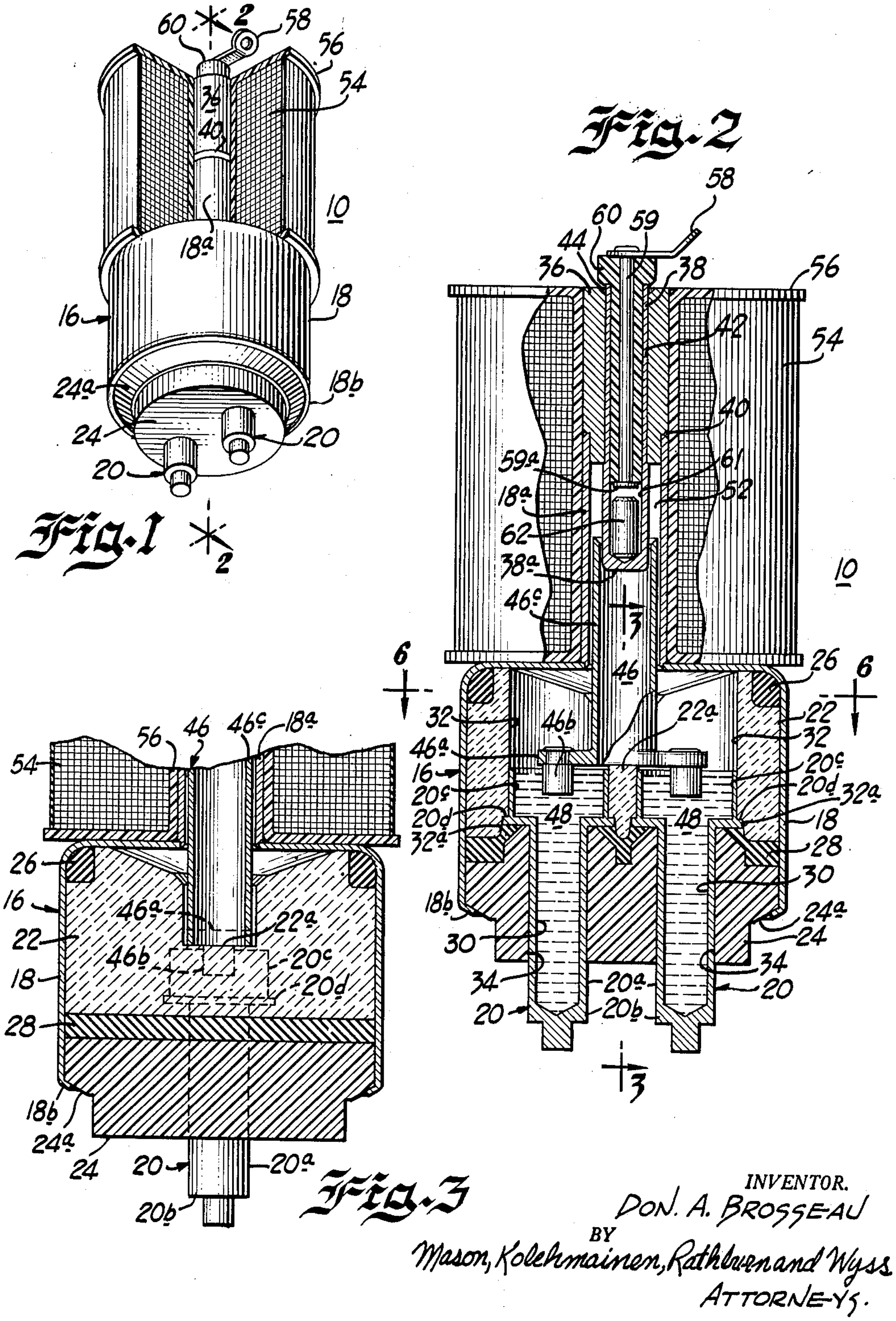
FIG. 1 is a perspective view, partly in section, of the improved switching device of the present invention.
FIG. 2 is an enlarged view, partly in section, taken along line 2—2 of FIG. 1, illustrating the closed circuit or deenergized condition of the switching device of the present invention.
FIG. 3 is a fragmentary sectional view taken on line 3—3 of FIG. 2, assuming that FIG. 2 shows the complete structure.

Briefly, the present invention concerns a new and improved switching device including electromagnetic means comprising an electromagnet having a stationary field member, an electromagnetic winding, a pilot or auxiliary armature, and a main or principal armature. The pilot armature is movable toward the field member in response to a first predetermined value of current flow through the winding. The main armature is movable toward the field member when a current of a second predetermined value flows through the winding. Means are provided for completing an electric control or power circuit through the field member and both the armatures when the pilot armature engages the field member and this electric circuit energizes the winding to the value of current necessary to actuate the main armature. Sufficient magnetic flux is produced at the first level of current flow to move the pilot armature into engagement with the field member and to hold the main armature against the field member once it has been moved to that position, but insufficient in itself to actuate the main armature. The closing of the control circuit, however, is effective to increase the energization of the winding to the predetermined current value necessary to actuate the main armature and thereby to actuate the switch. According to an important aspect of the present invention, the main armature is provided with a hollow portion so that when the main armature is actuated it encircles the pilot armature thereby stealing the magnetic flux from the pilot armature and bypassing this flux around the pilot armature so that the pilot armature is released and the control circuit is de-energized.

Referring now to the drawings, there is illustrated an electromagnetically controlled switching device 10 including a hermetically sealed mercury switch described in detail hereinafter. The device 10 comprises a hermetically sealed envelope generally designated at 16 which encloses a cavity in the general form of an inverted Y. This envelope 16 is defined by a plurality of elements 18, 20, 22, 24, 26, and 28, as described hereinafter.

Considering these envelope defining elements in detail, there is provided an outer support member 18 in the form of an inverted cylindrical cup having a central axially disposed tubular projection **18*a* of a diameter substantially less than that of member 18 projecting upwardly from the closed end of the inverted cup 18. As will become apparent from the description included hereinafter, projection 18*a* also functions as a main armature guide. The support member 18 and projection 18*a* are preferably formed of stainless steel or other material of low magnetic permeability, and they may be formed as an integral unit or separately, as illustrated, and then welded or otherwise integrally joined as shown in FIGS. 2, 3, 4, 5, and 7 of the drawings. The support member 18 forms a protective housing for the element 22 and to some extent the elements 20 and 24** and for the movable switch parts described hereinafter.

Preferably the elements 20 are in effect hollow terminals which are formed of a mercury resistant conducting material such as stainless steel, but may obviously comprise other conducting material. As illustrated, each hollow terminal 20 includes an elongated tubular portion **20*a* closed at one end as indicated at 20*b*, the closed end preferably defining a portion with which an electrical connection can readily be made. The other end of each hollow terminal 20 remote from the closed end 20*b* comprises an enlarged cylindrical portion indicated at 20*c* connected to the tubular portion 20*a* thereby to define a mercury containing chamber 30 within each hollow terminal as clearly shown in FIGS. 2 and 4 of the drawings. Projecting outwardly from the junction between portions 20*a* and 20*c* is a peripheral flange 20*d*** the purpose of which will become apparent from the ensuing description.

Figure 4:
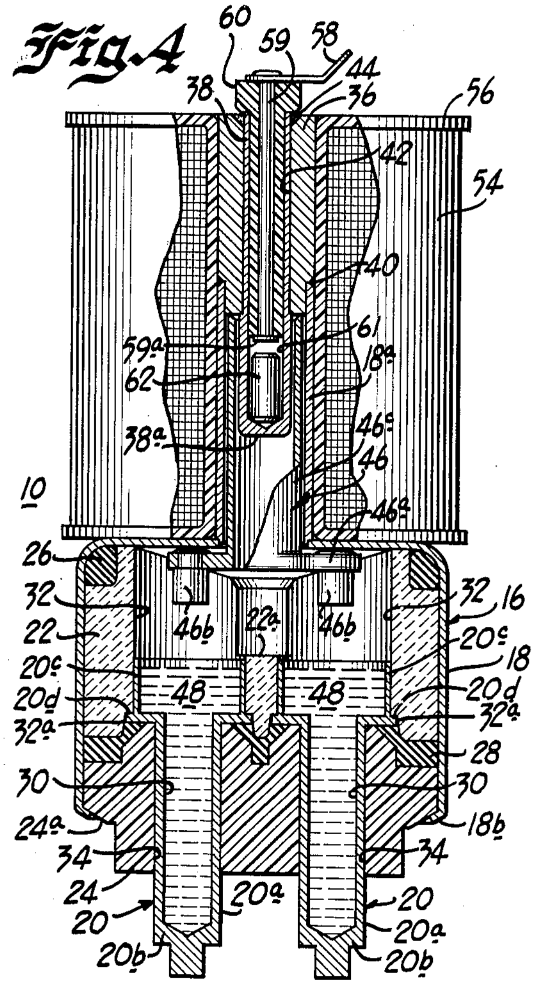
FIG. 4 is a view similar to FIG 2 but showing the switching device in the open circuit and energized condition.
Figure 6:
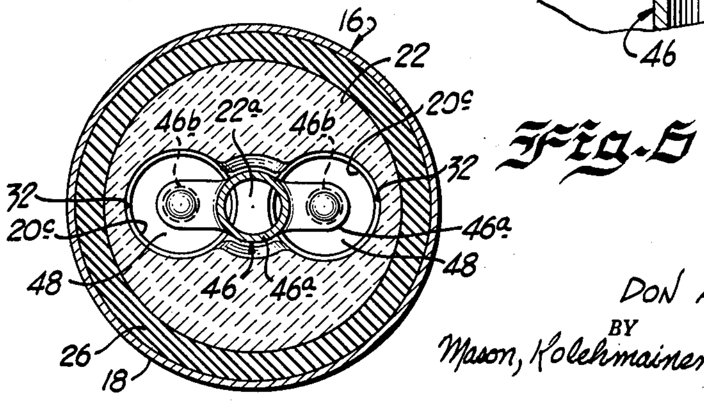
FIG. 6 is a sectional view taken on line 6—6 of FIG. 2, assuming that FIG. 2 shows the complete structure.

The element 22 of the envelope 16 is in effect a cylindrical blocklike member preferably formed of an insulating ceramic material resistant to mercury. This element is provided with a pair of spaced circular openings 32 (FIGS. 6 and 7) of a diameter snugly to receive the portions **20*c* of terminals 20 within the lower ends thereof. Preferably the lower ends of the openings 32 are counterbored as designated at 32*a* to receive the flanges 20*d* which then accurately position the terminals 20 relative to element 22. The wall 22*a* between the openings 32 is cut away above the level of the top of portions 20*c* or the element 22 is initially molded with the wall portion 22*a*** terminating at this level as best shown in FIGS. 2 and 4 of the drawings.

The element 24, referred to above, is a sort of base member preferably formed of a suitable insulating material having spaced openings 34 therein to permit the terminals 20 to extend therethrough. As illustrated, the exterior of element 24 includes an angularly disposed annular surface **24*a*** whose function is described hereinafter.

In order to seal the portion of envelope 16 other than the upper end of tubular projection **18*a*, there are provided the elements 26 and 28 comprising an O-ring 26 and a gum rubber gasket or sealing member 28, the latter being interposed between insulating elements 22 and 24, while the former is interposed between the upper end of element 22 and the support member 18. With the elements defining the envelope 16 shown disassembled in FIG. 7, a compressive force is applied to compress the O-ring 26 and gasket 28, and the lower end of support member 18 is spun against the surface 24*a* as indicated at 18*b*** thereby to hold all parts in sealed relation as clearly shown in FIGS. 2 and 4 of the drawings.

To completely seal the hermetically sealed chamber 16, the upper end of tubular projection **18*a* is closed by two elements 36 and 38, respectively, the former comprising a field or stator member of soft iron having a short portion of reduced cross section inserted into the upper end of projection 18*a* and welded thereto as indicated at 40 to provide a suitable gas tight seal. The stator member 36 is of somewhat tubular configuration with a central opening 42 to receive therein the element 38, the latter being closed at its lower end as indicated at 38*a*. The upper ends of elements 36 and 38 are sealed together as indicated at 44 as by welding or the like. The element 38**, as will become apparent from the ensuing description, defines a hollow cup-shaped guide for a pilot armature described hereinafter and is preferably formed of stainless steel or other material of low magnetic permeability. With the above-described arrangement there is provided a completely sealed envelope which can be manufactured in a simple manner.

Mounted within the hermetically sealed envelope 16, there is provided an electromagnetically actuated switching member 46, comprising a conducting bridging member **46*a* formed of good conducting material supporting adjacent either end thereof spaced depending contact members 46*b* preferably formed of arc resistant contact material such as molybdenum, tungsten or the like. The bridging member 46*a* is normally adapted to rest on the wall portion 22*a* whereby the contact members 46*b* extend into two spaced mercury pools 48 contained within the chambers 30 defined in the hollow terminals 20. Preferably, the mercury level is flush with the upper ends of the hollow terminals when the contacts are in the position of FIG. 2 of the drawings, which is the closed circuit position, but the level is slightly below this when the main switch is in the open position shown in FIG. 4 of the drawings. It will be understood that gravity will normally maintain switching member 46** in the closed circuit position shown in FIG. 2 of the drawings.

To improve the arc interrupting ability of this switching device 10 at the contacts **46*b*, the hermetically sealed envelope 16** is preferably evacuated and filled with an inert gas, such as argon or hydrogen, to a pressure of the order of twenty pounds per square inch in a manner hereinafter described.

In order that the switching member 46 of the switching device 10 may be electromagnetically actuated by means outside the envelope 16, there is provided a main or principal armature 46c of magnetically attractive material, such as soft iron, which is illustrated as being formed integrally with the bridging member 46a, although obviously it could be made separately and secured thereto. As illustrated, the main armature 46c is of tubular form and of such diameter as to be coaxially and concentrically disposed relative to armature guides 18a and 38. Moreover, as shown in FIGS. 2 and 4 of the drawings, the upper end of main armature 46c is always disposed in the annular space between these guides designated as 52 in the drawings whereby pilot guide 38 extends into the upper end of tubular armature 46c and main armature guide 18a surrounds armature 46c. Thus, the main armature 46c, including the bridging member 46a secured thereto, is normally adapted under the force of gravity to move to the lowermost position indicated in FIGS. 2, 3 and 9 of the drawings where the contacts 46b extend into the mercury pools 48 thus completing an electrical circuit between terminals 20. However, by means described hereinafter, the armature 46c is moved upwardly, and upward movement is guided by the inside surface of projection or guide 18a and the outside surface of guide 38 as clearly shown by FIGS. 4 and 5 of the drawings. Upward movement of the main armature 46c will, of course, interrupt the circuit between the two terminals 20.

To actuate the main armature 46c within the hermetically sealed envelope 16, there is provided a winding or coil 54 suitably wound on an insulating spool or support 56 and closely surrounding the tubular projection 18a and the stator member 36 as best shown in FIGS. 1 and 2 of the drawings. With this arrangement coil 54 is concentric with the common axis of main armature 46c and main armature guide 18a. The winding 54 may be connected in an electrical circuit in various ways as for example illustrated in my aforementioned joint copending application. One arrangement is hereinafter more fully described in connection with FIG. 9 of the drawings. To connect coil or winding 54 into such an electrical circuit it is illustrated as comprising two terminals 54a and 54b (FIG. 9), but obviously it could have an additional terminal if desired as shown in said copending application.

Figure 5:
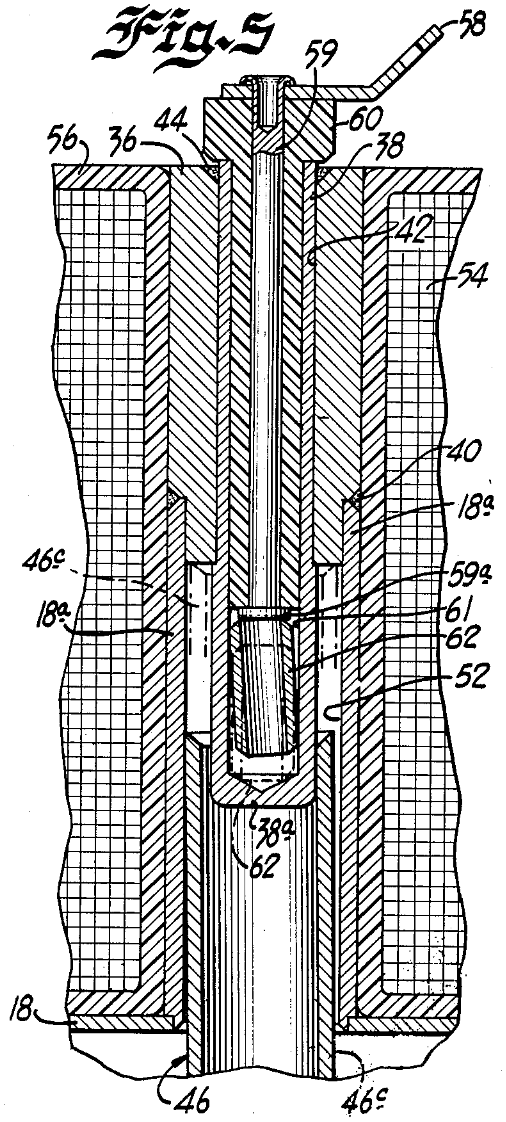
FIG. 5 is a greatly enlarged fragmentary view of FIG. 2 showing an operating condition intermediate that of FIGS. 2 and 4.

In addition to the main terminals 20 and the coil terminals 54a and 54b, the switching device 10 is provided with another terminal 58 connected to a conducting rod 59 disposed within pilot armature guide 38 and insulated therefrom by an insulating sleeve 60. The conducting rod 59 terminates at its lower end in a headlike member 59a which defines an electrical contact hereinafter referred to as pilot contact 59a. Thus the field or stator member 36, the pilot armature guide 38, the insulating sleeve 60 and conducting rod 59 are all concentrically arranged within winding or coil 54 and there is defined within the lower closed end of pilot armature guide 38 below pilot contact 59a a pilot armature chamber 61 (FIGS. 2, 4 and 5). Preferably elements 58, 59 and 60 are formed as a subassembly and this subassembly is press fit into pilot armature guide 36.

In accordance with the present invention, there is disposed within pilot armature chamber 61 an auxiliary or pilot armature 62 formed of cold rolled steel or other electrically conducting and magnetically attractive material. As illustrated, pilot armature 62 is of generally tubular shape and is movable between the closed bottom 38a of pilot guide 38 and the pilot contact 59a.

For the purpose of utilizing pilot armature 62 as an electrical conductor as well as an armature for an electromagnetic device, the diameter of chamber 61 is substantially larger than the outer diameter of pilot armature 62. With this arrangement free relative movement can occur between the pilot armature 62 and stationary pilot contact 59a. However, by virtue of this space between pilot armature 62 and pilot armature guide 38, the former tends to tip to one side or the other when electromagnetically actuated thereby insuring continuous electrical contact between elements 62 and 38. This is shown somewhat exaggerated in FIG. 5 of the drawings, where pilot armature 62 electrically interconnects guide 38 and contact 59a. Obviously, when pilot armature 69 is in the position of FIG. 2 of the drawings it is in electrical engagement with the bottom of guide 38.

In a similar manner the main armature 46c is utilized electrically to connect mercury pools 48 and pilot armature guide 38. Thus, the main armature 46c also tends to tip slightly to one side or the other within the envelope 16, and this tipping action is limited by engagement of the main armature 46 with the outer surface of the plunger guide 38 or with the inner surface of the armature guide 18a as also shown in somewhat exaggerated fashion in FIG. 5 of the drawings. With this arrangement an electrical connection between armatures 46c and 62 is assured at all times.

As illustrated in FIG. 2 of the drawings, the main armature 46c has a lowermost or closed main switch position determined by engagement of the bridging member 46a with the wall 22a. When the main armature 46c is in this switch closed position, an air gap is defined between the upper end of the tubular main armature 46c and the lower end of the soft iron core of the stator member 36 as best shown in FIGS. 2 and 5 of the drawings, which air gap is bridged only by material of low magnetic permeability, such as the stainless steel tubular projection 18a and the stainless steel pilot guide 38. When a current of a predetermined low magnitude flows through the winding 54, the pilot armature 62 will be actuated and will tend to move upwardly from the position illustrated in FIG. 2 to the position illustrated in FIG. 5 of the drawings to electrically interconnect armatures 46c and 62 through pilot guide 38 as clearly shown in FIG. 5. This low magnitude current flow is not sufficient to pick up main armature 46c which remains in the position shown in FIG. 5 of the drawings. With the pilot armature in this energized position, an electrical circuit is completed between terminal 58 and the terminal 20, and this circuit may be utilized to cause a current of a predetermined higher magnitude to flow through the winding 54. Moreover, when winding 54 is energized with this current of predetermined higher magnitude, the main armature 46c moves upwardly from the position illustrated in FIG. 2 to the position illustrated in FIG. 4 of the drawings wherein the upper end of armature 46c engages the lower end of stator 36. As soon as this happens the flux path through stator 38 and engaging main armature 46c has a very low reluctance as compared to the flux path through the pilot armature 62 with the result that the force produced by virtue of the magnetic flux through the pilot armature 62 is greatly reduced since this flux is bypassed through the parallel path through the main armature 46c. Thus pilot armature 62 drops from the position illustrated in FIG. 5 to the position illustrated in FIG. 4 while the main armature remains in the position shown in FIG. 4. When the pilot armature 62 separates from pilot contact 59a, the current through winding 54 reduces to the predetermined lower magnitude which though not sufficient to move main armature 46c is sufficient to hold it in the energized position of FIG. 4 once it has moved to that position. In this energized or switch open position of the main armature 46c, the bridging portion 46a is raised to lift the contact members 46b out of the mercury wells 48 so that the electrical circuit between the main terminals of the switch device 10 is opened.

Figure 7:
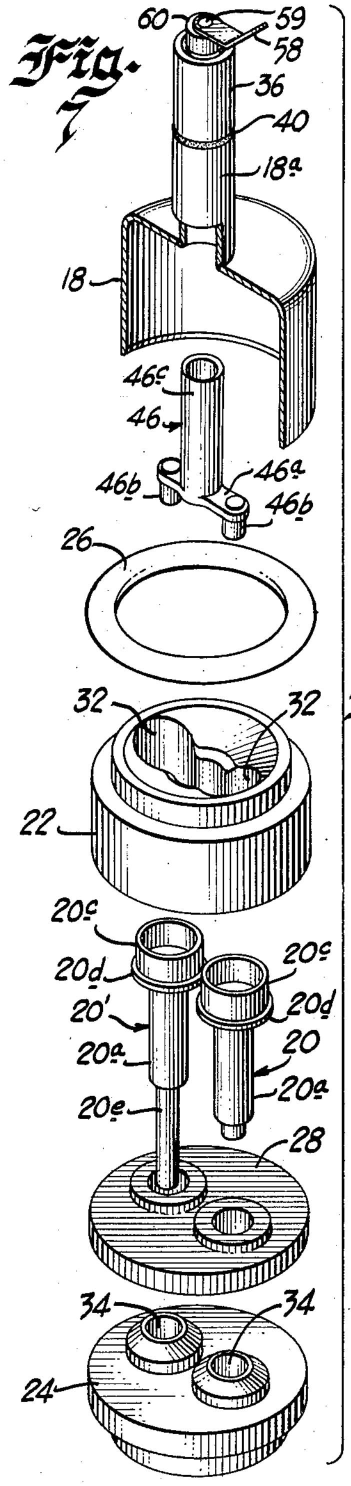
FIG. 7 is an exploded perspective view of the improved switching device of the present invention at a manufacturing stage thereof, with certain portions cut away.
Figures 8, 9, 10, 11:
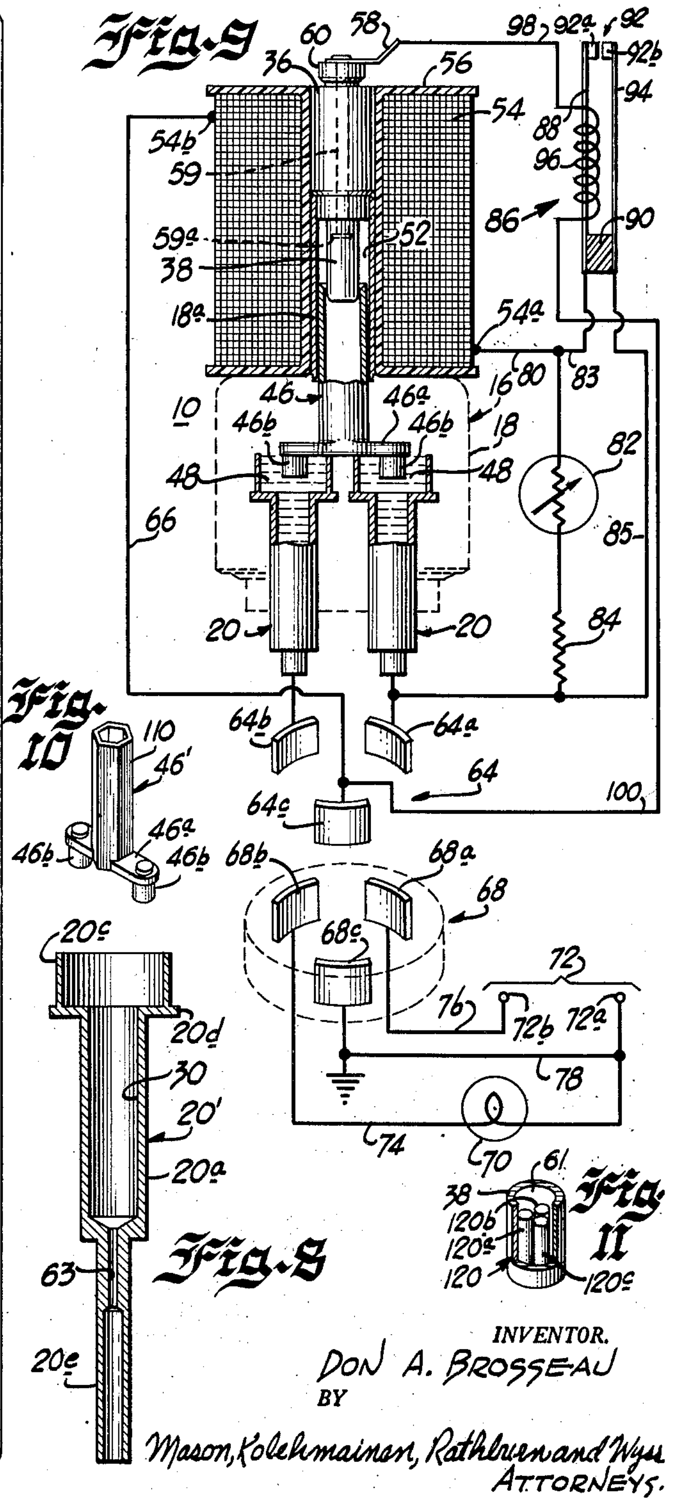
FIG. 8 is an enlarged sectional view of one element shown in FIG. 7 of the drawings.
FIG. 9 is a somewhat schematic diagram illustrating one application of the switching device of the present invention.
FIG. 10 is a perspective view of an improved switching member for a switching device according to another embodiment of the present invention.
FIG. 11 is a fragmentary perspective view of a switching device illustrating a modification of the pilot armature of the present invention.

For the purpose of filling the chambers 30 in the terminals 20 with mercury and also for evacuating the envelope 16 and, if desired, for supplying gas under pressure to this envelope, one of the terminals 20 for each switching device as manufactured and when initially assembled is slightly different from the other terminal 20. As best shown in FIGS. 7 and 8 of the drawings, this different terminal is designated as 20' and differs from the other terminal 20 only with respect to the closed end thereof. Terminal 20' does not initially have the closed end but instead includes an integral tubular extension 20e having a longitudinal passageway 63 therein, connected to chamber 30. In manufacturing switching device 10, the parts described above are assembled with one terminal 20 and one terminal 20′ of the form shown in FIG. 8. The sealed envelope 16 is then defined by making the welds 40 and 44 and by compressing the sealing members 26 and 28 which are continuously held in compressed condition to perform their sealing function by the deformation 18b on the lower edge of inverted cup 18.

From the above description it will be apparent that the passageway 63 in terminal 20′ affords a means by which the proper quantity of mercury can be introduced into the sealed envelope 16. After introduction of the mercury, a vacuum can be produced within envelope 16 utilizing passageway 63, and, if desired, a suitable inert gas such ar argon or the like may be supplied under a desired predetermined pressure. Thereafter, the passageway 63 in terminal 20′ is closed and the portion 20e cut off so as to be substantially identical with the other terminal 20 as indicated in FIGS. 2 and 4 of the drawings, thereby hermetically sealing the envelope 16.

Considering now a possible application of the present invention, there is illustrated schematically in FIG. 9 an electrical circuit wherein the switching device 10 is operable in response to changes in a low level electrical characteristic, such as would result from a light responsive control means, to thereby control the high current switching member 46. As shown in FIG. 9, the terminals 20 are connected to terminals 64a and 64b of a conventional three terminal plug 64 whose third terminal 64c is connected to terminal 54b by winding 54 by a conductor 66. The plug 64 is receivable in a suitable corresponding three receptacle connector 68 comprising terminals 68a, 68b and 68c which are adapted to make electrical connection with the terminals 64a, 64b and 64c, respectively. The electrical circuit with the three receptacle connector 68, as schematically illustrated in FIG. 9 of the drawings, comprises a lighting load schematically indicated at 70 connected between terminal 68b and one terminal 72a of an alternating source 72 by a conductor 74. The terminal 68a is illustrated as being connected by a conductor 76 with the other terminal 72b of the alternating current source 72. The terminal 68c indicated as the neutral or grounded terminal is also connected to the terminal 72a of the alternating current source by a conductor 78. When the contacts 46b are in the mercury pools 48 and the plug connector 64 is in electrical engagement with the receptacle 68, the load 70 is energized. Conversely, when the bridging contacts 46b are raised out of the mercury pools 48, the lighting or load circuit comprising load 70 is deenergized.

The control circuit for the winding 54, in addition to that already described comprises a conductor 80, one end of which is connected to terminal 54a of winding 54 while the other end is connected to the terminal 64a of plug connector 64 through a series circuit including a light sensitive element 82 and a current limiting resistor 84. The resistor 84 has such a magnitude of resistance to insure that the current through winding 54 is not excessive regardless of the condition of light sensitive element 82. Additionally, the control circuit for winding 54 in addition to those elements includes a delaying means generally designated by the reference numeral 86 connected in parallel with the light sensitive element 82 and the current limiting resistor 84 by conductors 83 and 85. As illustrated, the delaying means comprises a bimetallic element 88 having one end thereof secured to a suitable insulating support 90. The free end of the bimetallic element 88 supports the movable contact 92a of a normally open switch 92 comprising in addition to the contact 92a a stationary contact 92b. The contact 92b is connected by a conducting support 94 also mounted on the insulating support 90 to conductor 85. Associated with the bimetallic element 88 is a suitable heater winding 96 which is schematically indicated as being wound around an intermediate portion of the bimetallic element 88. One terminal of the heater winding 96 is connected to the terminal 58 by a conductor 98, while the other end of the heater winding 96 is connected to the terminal 64c by a conductor 100. It should be understood that conductor 83 could be connected to an intermediate tap in the winding 54, as more fully described in my copending joint application mentioned above rather than the tap 54a. The bimetallic element 88 is designed so that upon heating thereof the contact 92a of switch 92 moves to the right, as viewed in FIG. 9 of the drawings, thereby to close the contacts of the switch 92.

The circuit components in the positions illustrated in FIG. 9 of the drawings are representative of what would be true if the light sensitive element 82 were not subjected to light. Under this condition the winding 54 would be deenergized and the lighting load 70 energized. As the intensity of the light impinging on the light sensitive element 82 increases as daylight approaches, the current in the winding 54 gradually increases until the magnetic force produced is sufficient to move the pilot or auxiliary armature 62 upwardly from the position shown in FIG. 2 and into engagement with the pilot contact 59a, illustrated in FIG. 5. This causes closing of a first circuit through the heater winding 96 of the delaying device 86 from the terminal 72b of the electrical source 72 through conductor 76, terminals 68a, 64a, 20, switching member 46, pilot armature guide 38, pilot armature 62, pilot contact 59a, conductor 59, terminal 58, conductor 98, heater winding 96, conductor 100, terminals 64c and 68c and conductor 78 to terminal 72a. After a predetermined time delay sufficiently long enough to eliminate improper operation due to momentary external conditions, such as in the case of a lighting circuit, the occurrence of lightning flashes or the like, switch 92 will be closed and an auxiliary energization circuit for the winding 54 will be completed. This auxiliary energization circuit bypasses the elements 82 and 84 and establishes the control circuit from terminal 72b of electrical source 72 through terminals 68a and 64a, conductor 85, conducting support 94, switch 92, bimetallic element 88, conductor 83, terminal 54a, winding 54, terminal 54b, conductor 66, terminals 64c and 68c, and conductor 78 to terminal 72a. The design of the electromagnetic switching device 10 is such that when sufficient current flows through winding 54 to cause the pilot armature 62 to move from the position shown in FIG. 2 of the drawings to the position shown in FIG. 5 of the drawings, this current is sufficient to hold the main armature 46c in the raised or FIG. 4 position once it has been moved to that position but it is insufficient to cause the main armature 46c to move from the FIG. 2 to the FIG. 4 position. The completion of this auxiliary energization circuit causes an increase in current flow through the winding 54 of sufficient magnitude to actuate the main armature 46c upwardly to the open switch position illustrated in FIG. 4 of the drawings.

As was mentioned above, as soon as the main armature 46c is moved to the main switch open position of FIG. 4, the pilot armature 62 is released due to the relatively high reluctance of the flux path through pilot armature 62 as contrasted with the reluctance of the flux path bypassing this pilot armature. Immediately upon release of the pilot armature 62, the circuit through the heater winding 96 of the delaying device 86 is opened and the bimetallic element 88 begins to cool. As soon as the bimetallic element 88 has cooled sufficiently, the contact 92a moves to the left, as viewed in FIG. 9, the switch 92 is opened, and the auxiliary energization circuit through the winding 54 is opened. This arrangement then insures that inadvertent opening and closing of the main switch contacts 46b is eliminated, for, if the main armature 46c is released due to a decrease in current, the pilot armature 62 will have previously been released and no low impedance circuit through the winding 54 is available to cause immediate pickup of the main armature 46c following release thereof. Moreover, the delay in opening of the switch 92, after the pilot armature 62 is initially released, keeps the auxiliary energization circuit closed for a sufficient period that the main armature 46c will move toward the stator 36 without bouncing therefrom. In other words, the delaying device 86 is effective to maintain the heavy flux through the annular space 52 for a period of several seconds after the circuit through the pilot armature 62 is broken so that the main armature will be held in its upper position until it becomes stable in this position.

In order to prevent condensed mercury vapor which may form in balls between the main armature 46c and the armature guides 38 and 18a from holding up the release of the armature and thereby adversely affecting the operation of the relay, it may be desirable to provide sufficient clearance between the main armature 46c and the armature guides to prevent the collection of mercury balls. It has been found that a radial clearance of .030 inch between the armature guide 18a and the main armature 46c and between the main armature 46c and the armature guide 38 is sufficient to prevent the accumulation of the mercury balls.

Another embodiment wherein condensed mercury vapor which may collect between the main armature and the armature guides will not adversely affect the operation of the relay is illustrated in the switching member of FIG. 10 where the corresponding parts are designated by the same reference numerals as in the preceding figures. As therein illustrated, a switching member 46' comprises the conductive bridging member 46a and the depending contact members 46b previously described. In order that the switching member 46' may be electromechanically actuated, it is provided with a main or principal armature 110 of magnetically attractive material, such as soft iron generally the same except as hereinafter described with main armature 46c. It differs from 46c, however, in that instead of being cylindrical it is of hollow hexagonal tubular form and of such diameter as to be coaxially and concentrically disposed relative to the armature guides 18a and 38. It is to be understood that the switching member 46' can be used in the embodiment of FIGS. 1 to 9 in place of the switching member 46 illustrated therein. By the use of the hexagonal tubing for the main armature 110, there are provided spaces where mercury balls can accumulate until they are flushed out by the lifting and dropping of the armature. Without the provision of such spaces or similar clearances, mercury vapor might condense and accumulate as small balls which act like small rubber balls tending to push the armature to one side or the other with sufficient pressure to prevent its free movement up and down. Mercury will continue to accumulate until the balls reach a sufficient diameter where they have enough weight to cause them to drain back into the mercury wells. However, if the gap between the armature and the guides is only a few thousandths of an inch, these balls merely flatten out and exert pressure without draining back into the well. As will be readily appreciated, the flat areas on the outside of the modified switching member 110 provide larger spaces where the mercury balls can accumulate and grow until they reach a sufficient size that they may be flushed out in a manner similar to that provided by the clearance between the armature 46 and the armature guides 38 and 18a in the embodiment of FIGS. 1 to 9. Although the hexagonal armature 110 is another of the satisfactory embodiments, it will be appreciated that vertical slots in the armature 46c, the use of a small number of tines as the main armature, or other modifications may be used which will provide the required spaces for the mercury balls to collect.

In order to provide maximum sensitivity of the switching device 10, the pilot armature may have a multitude of configurations different from that illustrated in the embodiment of FIGS. 1 to 9 and there are certain advantages which are obtainable with some of these modifications. FIG. 11 illustrates a modified form of a pilot armature which may be used in the chamber 61 of the pilot armature guide 38. As illustrated in the embodiment of FIG. 11, this pilot armature, designated at 120, comprises a plurality of separate cylindrical pins 120a, 120b and 120c, formed of electrically conductive, magnetically attractive material, nested in side-by-side relation and occupying the same space within the chamber 61 as the pilot armature 62 occupies in the embodiment of FIGS. 1 to 9. The three nested pins 120 arranged in side-by-side relationship insure good contact between the pilot armature 120 and the pilot guide 38 and contact 59a. Moreover, the armature 120 lifts at a very consistently accurate level of light for it is necessary that only one of the plurality of pins 120a, 120b or 120c, which form the pilot armature 120, be raised to engage the contact 59a in order to actuate the circuit controlled thereby. It is particularly desirable for street light controls that the light level differential between turn-off and turn-on not be more than two to one. The three-pin pilot armature 120 permits practically any desired differential, and, as a matter of fact, the differential may be held to a very small margin. Of course, it is to be understood that the pilot armature may take on several other forms, for example, it may be formed with a head on it so that it has, basically, two different diameters. Different operating characteristics, of course, result from different shaped pilot armatures.

Figure 12:
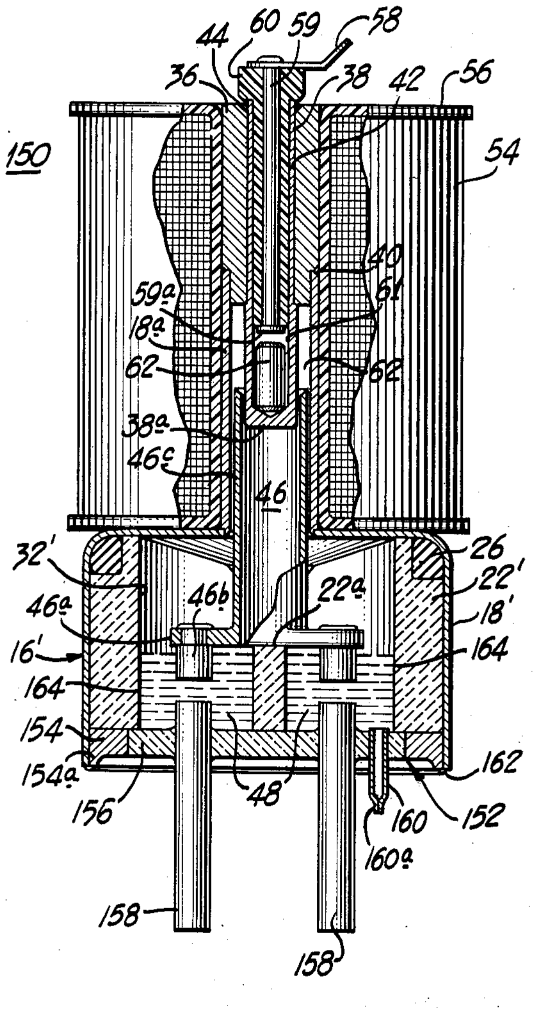
FIG. 12 is a sectional elevational view of a modified switching device according to the present invention and illustrating the closed circuit or de-energized condition of the switching device.
Figure 13:
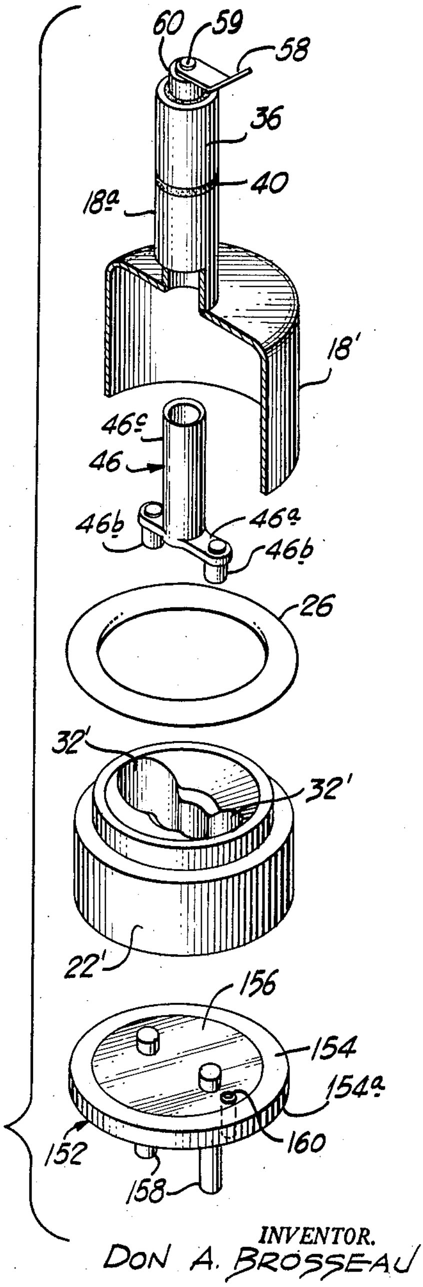
FIG. 13 is an exploded perspective view of the embodiment of FIG. 12 at a manufacturing stage thereof, with certain portions thereof removed.

A presently preferred commercial embodiment of the present invention which can be readily and economically manufactured is illustrated in the embodiment of FIGS. 12 and 13, where the corresponding parts are designated by the same reference numerals as in the preceding figures. Referring now to FIGS. 12 and 13, there is illustrated an electromagnetically controlled switching device 150 including a hermetically sealed mercury switch enclosed within a sealed envelope generally designated at 16' which encloses a cavity in the general form of an inverted Y and which is defined by a plurality of elements 18', 22', 26, closed by a base section 152. The elements 18' and 22' are similar to the elements 18 and 22 heretofore described in the preceding embodiments. Considering these elements briefly, there is provided an outer support member 18' in the form of an inverted cylindrical cup having the centrally aligned disposed tubular projection 18a projecting upwardly from the closed end of the inverted cup 18' and which functions as a main armature guide. As heretofore described, the support member 18' and the projection 18a are preferably formed of stainless steel or other material of low magnetic permeability joined to form an integral protective housing. The element 22' of the envelope 16' is in effect a cylindrical blocklike member preferably formed of an insulating ceramic material resistant to mercury and provided with a pair of spaced openings 32'. The wall 22a between the openings 32' is cut away above the level of the top of the element 22' or the element 22' is initially molded with the wall portion 22a terminating at this level, as best seen in FIG. 12.

The base assembly 152 is preferably a pre-assembled unit and comprises an outer ring 154 of stainless steel or other metal and an inner disc 156 of glass or other electrically insulating material. The stainless steel ring 154 exerts sufficient compressive load on the disc 156 to form a hermetic seal between the ring 154 and the glass disc 156. A pair of spaced cylindrical terminal members 158 are hermetically sealed through the glass disc 156 and extend into the lower portion of the openings 32'.

In order to provide for initially evacuating the envelope 16', the base assembly 152 is initially formed with an exhaust tube 160 extending through the disc 156 and formed of a metal which may be pinched or burned to form a seal as indicated at 160a of FIG. 12.

In order to seal the portion of the envelope 16' other than the upper end of the tubular projection 18a, there is provided the O-ring 26 interposed between the upper end of element 22′ and the support member 18′. Prior to assembly, the lower surface of the element 22′ which engages the base assembly 152 is coated with a dielectric rubberlike cement such as that available under the trade name "Silastic" so that the openings 32′, after assembly. form a pair of chambers 164 in electrical isolation with each other and each containing a pool 48 of mercury, With the elements defining the envelope 16′ shown disassembled in FIG. 13, a compressive force is applied to compress the O-ring 26 and the ring 154, which has been formed with a downwardly extending tip portion 154*a* at its outer edge, is welded to the outer lower edge of the support member 18′ as indicated at 162. As best seen in FIG. 12, one of the terminals 158 extends into each of the mercury pools 48 in the lower end thereof, and the upper end of the mercury pools 48 are adapted to be bridged by the bridging member 46*a* and contacts 46*b* of the armature 46.

The remaining portions of the switching device 150 are identical to that heretofore described and are not described in detail in the present embodiment. However, the pilot armature is preferably of the type shown in FIG. 11 of the drawings. Moreover, the operation of the switching device 150 is identical to that heretofore described and, therefore, is not hereinafter described in detail.

For the purpose of obtaining the maximum lift on the armature 46, and in order to maintain a relatively uniform flux path for this armature, whether pilot armature 62 is in its energized or deenergized position, it has been found preferable to make the pilot armature partly of magnetic material and partly of non-magnetic material. In an embodiment built in accordance with the present invention, the upper one-third to one-half of the pilot armature 62 was made of magnetic material and the remainder or lower portion thereof was made of a non-magnetic material such as brass. The magnetic and non-magnetic parts of this pilot armature were held together either by soldering or by a press fit telescoping one portion of the armature into the other. Without this arrangement, it will be appreciated that when pilot armature 62 is in its upper or energized position the reluctance of the flux path for main armature 46 is actually decreased. This is because the flux gap between the stator 36 and the pilot armature 62 decreases, while the flux gap between pilot armature 62 and the armature 46 remains pretty much unchanged. By making the pilot armature 62 of two materials, a relatively uniform flux gap is provided to maintain the maximum lift on armature 46.

In view of the detailed description included above, the operation of the instant switching device will readily be understood by those skilled in the art and no further discussion of such operation is included herewith. It should also be understood that the instant switching device may be used as a component of the control means disclosed and claimed in copending Keeran application, Serial No. 782,907, filed December 24, 1958, and assigned to the same assignee as the instant application. Moreover, the switching device of the present invention may readily be incorporated in the various arrangements disclosed in my joint copending application referred to above and can equally well be used with temperature sensitive or pressure sensitive devices instead of the light sensitive device 82 shown in FIG. 9 of the drawings.

While there have been illustrated and described several embodiments of the present invention, it is not desired that the invention be limited to the specific constructions shown and described for it will, of course, be obvious to those skilled in the art that changes and modifications may be made without departing from the invention, and it is, therefore, aimed in the appended claims to cover all those changes and modifications as fall within the true spirit and scope of the present invention.

What is claimed as new and desired to be secured by Letters Patent of the United States is:

1. Switching apparatus comprising an electromagnet including a stationary field member, a winding, a pilot armature movable toward said field member when a current of a first predetermined value flows through said winding, switching means including a main armature movable toward said field member to encircle said pilot armature when a current of a second predetermined value flows through said winding whereby at least some of the magnetic flux biasing said pilot armature toward said field member is bypassed through said main armature around said pilot armature, said first predetermined current value being less than said second predetermined current value and insufficient to move said main armature toward said field member but sufficient to hold said main armature against said field member, means for completing an electric control circuit through said pilot armature when said pilot armature is biased toward said field member, and means responsive to the completion of said electric control circuit for increasing the energization of said winding to said second predetermined value to move said main armature and to actuate said switching means.

2. Switching apparatus as set forth in claim 1 wherein said main armature is provided with spaces for accumulation of mercury.

3. Switching apparatus as set forth in claim 1 wherein said pilot armature comprises a plurality of cylindrical pins.

4. The combination of an electromagnetic apparatus as set forth in claim 3 and additionally including contact means operatively connected to said main armature.

5. Switching apparatus comprising an electromagnet including a stationary field member, a winding, a pilot armature movable toward said field member when a current of a first predetermined value flows through said winding, switching means including a main armature movable toward said field member to encircle said pilot armature when a current of a second predetermined value flows through said winding whereby at least some of the magnetic flux biasing said pilot armature toward said field member is bypassed through said armature around said pilot armature, said first predetermined current value being less than said second predetermined current value and insufficient to move said main armature toward said field member but sufficient to hold said main armature against said field member, and means responsive to movement of said pilot armature for completing an electric circuit whereby said electric circuit can be connected to increase the energization of said winding to said second predetermined value to move said main armature and to actuate said switching means.

6. Electromagnetic apparatus including a stationary field member, a winding, a pilot armature movable toward said field member when a current of a first predetermined value flows through said winding, a main armature movable toward said field member when a current of a second predetermined value flows through said winding, and means including said main armature for bypassing magnetic flux produced by said winding around said pilot armature when said main armature moves toward said field member thereby to release said pilot armature.

7. Switching apparatus comprising electromagnetic means including a stationary field member, a winding, a pilot armature movable toward said field member, switching means including a main armature movable around said pilot armature toward said field member whereby magnetic flux is bypassed around said pilot armature, cooperating means on said armatures for electrically interconnecting said armatures, first circuit means independent of said cooperating means for supplying electrical current of a relatively low magnitude to said winding, said current being sufficient to move said pilot armature toward said field member and to hold said main armature against said field member but being insufficient to move said main armature toward said field member, and second circuit means including said cooperating means for supplying electrical current of a greater magnitude to said winding, the last-mentioned electrical current being of sufficient magnitude to move said main armature toward said field member.

8. Switching apparatus comprising electromagnetic means including a stationary field member, a winding, a pilot armature movable toward said field member, switching means including a main armature movable toward said field member to encircle said pilot armature, first circuit means for supplying electrical current of a relatively low magnitude to said winding, and second circuit means for supplying electrical current of a greater magnitude to said winding in response to movement of said pilot armature.

9. Electromagnetic apparatus comprising field means, a winding on said field means, switching means including terminal means, a pilot armature movable to engagement with said field means, main armature means operatively connected to said switching means and movable toward said field member for bypassing magnetic flux around said pilot armature, and circuit means including said terminal means, pilot armature and main armature for establishing an electrical path when said pilot armature is in engagement with said field member.

10. Electromagnetic apparatus comprising a hermetically sealed envelope including an outer support member of inverted cylindrical cup shape having a central tubular projection, an insulating member in said support member, a base member enclosing the lower end of said support member, an O-ring positioned between said insulating member and said support member, means sealing said base member and said support member, said insulating member having a pair of apertures, a pair of terminal members extending through said base member and at least partially into said apertures in said insulating member, mercury pools in each of said apertures, a stator member of soft iron inserted in said tubular projection and having a central opening, a hollow cup-shaped element in said opening, said stator member and the last-named element sealing said envelope, a switching member in said envelope including a conducting bridging member having a pair of depending contact members adapted to extend into said mercury pools and a tubular main armature extending into said tubular projection, contact means in said last-mentioned element, and an auxiliary armature in said last-mentioned element movable into engagement with said contact means, said switching member being movable into a position in which said contact members are out of said mercury pools and said tubular armature moves into the path of magnetic flux acting on said pilot armature to bypass at least a portion thereof.

11. An electromagnetic apparatus as set forth in claim 10 wherein the base member is provided with an angularly disposed external surface, and wherein said means sealing said base member and said support members comprises gasket means positioned between said members, and wherein said pair of terminal members are hollow terminal members to provide said pools of mercury, and wherein said lower edge of said support member is deformed against the angularly disposed external surface of said base member to compress the O-ring and the gasket means.

12. Electromagnetic apparatus comprising a hermetically sealed envelope including an outer support member of inverted cylindrical cup shape having a central tubular projection, an insulating member in said support member, a base assembly enclosing the lower end of said support member, said base assembly including an outer metallic ring and an inner disc of electrically insulating material, and a pair of terminal members extending hermetically through said disc, an O-ring positioned between said insulating member and said support member, means sealing the bottom of said insulating member with said base member, means sealing said base member and said support member, said insulating member having a pair of apertures aligned with said terminal members, said terminal members extending at least partially into said apertures in said insulating member, pools of mercury in each of said apertures, a stator member of soft iron inserted in said tubular projection and having a central opening, a hollow cup-shaped element in said opening, said stator member and the last-named element sealing said envelope, a switching member in said envelope including a conducting bridging member having a pair of depending contact members adapted to extend into said mercury pools and a tubular armature extending into said tubular projection, contact means in said last-mentioned element, and an auxiliary armature in said last-mentioned element movable into engagement with said contact means, said switching member being movable into a position in which said contact members are out of said mercury pools and said tubular armature moves into the path of magnetic flux acting on said pilot armature to bypass at least a portion thereof.

13. The switching apparatus of claim 1 wherein said pilot armature has the portion thereof adjacent said field member formed of magnetic material and the remainder thereof formed of non-magnetic material.

References Cited in the file of this patent

UNITED STATES PATENTS

| | | |
|---|---|---|
| 1,707,541 | Roth | Apr. 2, 1929 |
| 3,018,418 | Conrad | Jan. 23, 1962 |